Figures 1, 2:
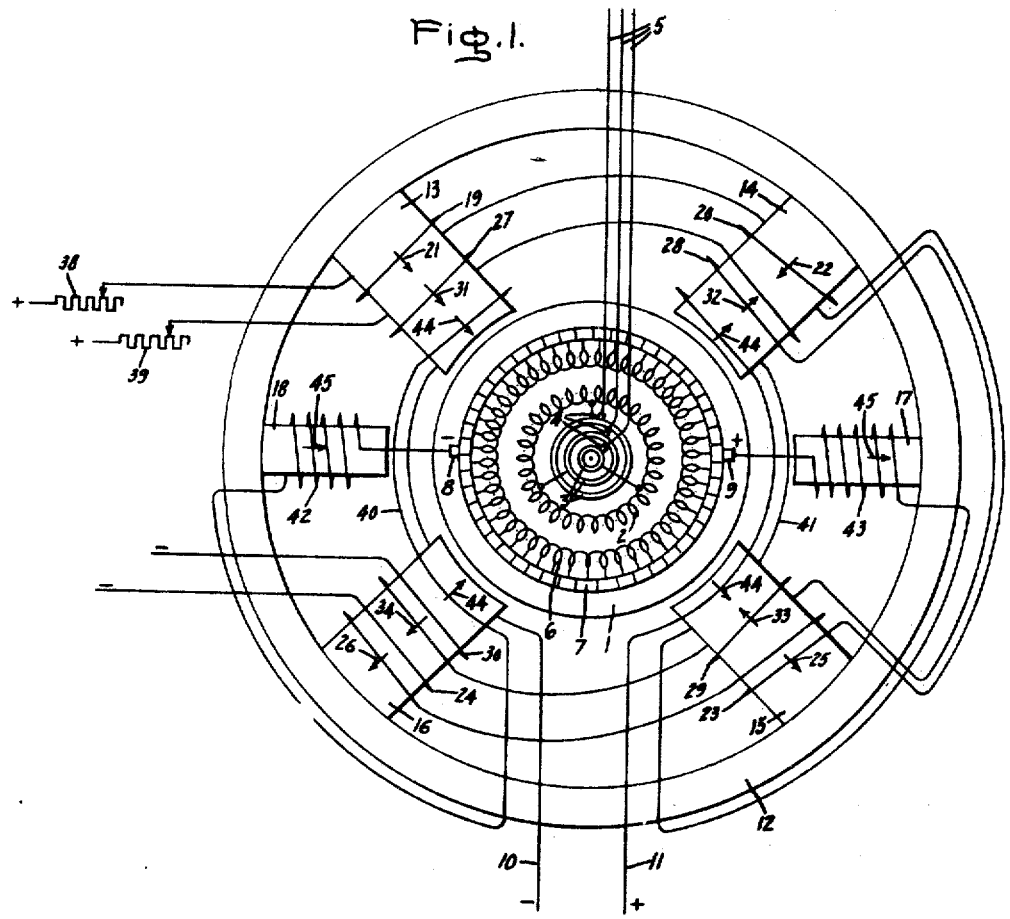

Sept. 18, 1945.  A. FISHER  2,385,199
DYNAMOELECTRIC MACHINE
Filed Dec. 8, 1944  2 Sheets-Sheet 1

Inventor:
Alec Fisher,
by Harry E. Dunham
His Attorney.

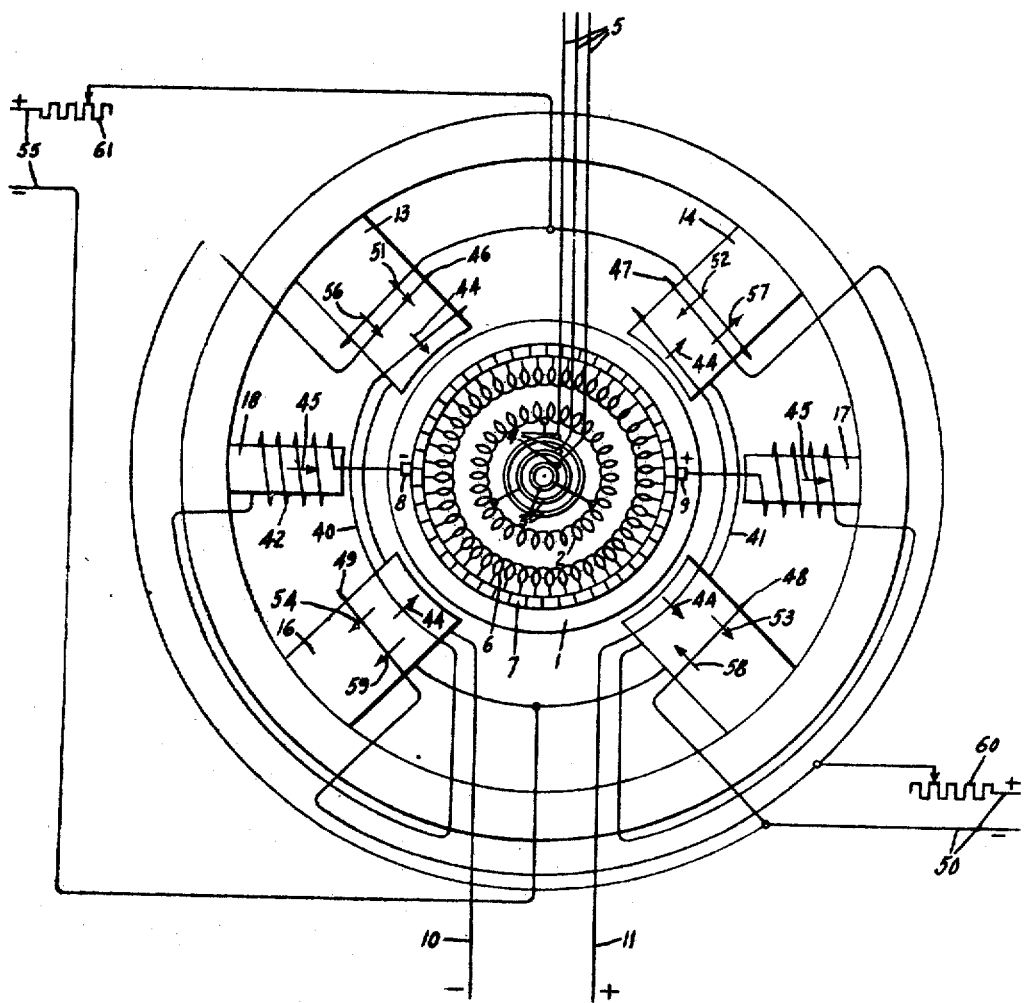

Patented Sept. 18, 1945

2,385,199

UNITED STATES PATENT OFFICE 2,385,199

DYNAMOELECTRIC MACHINE

Alec Fisher, Lynn, Mass., assignor to General Electric Company, a corporation of New York Application December 8, 1944, Serial No. 567,209

11 Claims. (Cl. 171—223)

My invention relates to dynamoelectric machines and particularly to a generator for generating alternating current and direct current using a single field structure and a single rotatable member.

An object of my invention is to provide an improved dynamoelectric machine for generating alternating current and direct current in the same rotatable member with a single field structure.

Further objects and advantages of my invention will become apparent and my invention will be better understood from the following description referring to the accompanying drawings, and the features of novelty which characterize my invention will be pointed out with particularity in the claims annexed to and forming part of this specification.

In the drawings, Fig. 1 is a schematic illustration of a dynamoelectric machine provided with an embodiment of my invention; Fig. 2 is a curve illustrating the flux distribution of the pole pieces forming the field structure of the machine shown in Fig. 1; and Fig. 3 is a schematic illustration of a dynamoelectric machine provided with another embodiment of my invention.

Referring to the drawings, I have shown in Fig. 1 a dynamoelectric machine provided with an embodiment of my invention in which a single field structure is provided for a single rotatable member having two windings, in one of which an alternating current is adapted to be induced, and in the other of which a direct current is adapted to be induced. In this structure, the rotatable member 1 is provided with an alternating current rotor winding 2 connected to collector rings 3, from which alternating current is adapted to be connected to any desired load by collector brushes 4 connected to terminal leads 5. The rotatable member also is provided with a direct current armature winding 6 connected to a suitable commutator 7 which forms an electrical contact with collector brushes 8 and 9 which are connected to the direct current terminals 10 and 11 of the machine through suitable field exciting windings which are provided on the stationary member of the machine. This stationary member forms the field structure of the machine and includes a magnet frame 12 provided with suitable polar projections for forming the magnetic poles of the machine. These polar projections are illustrated as comprising four main salient pole pieces 13, 14, 15, and 16 and a pair of commutating pole pieces 17 and 18. The voltage induced in an armature winding is dependent upon the total flux which is cut by the winding between the brushes which include each set or pair of poles of the machine. In the illustrated construction, the poles for the direct current armature winding 6 are formed by two salient pole pieces for each pole. The drawing illustrates a two-pole D.-C. machine; however, any multiple of this combination can readily be used by merely multiplying the field arrangement and the sets of brushes shown in the drawing. The direct current armature excitation is provided by a single pair of poles formed by the two pole pieces 13 and 14 and the two pole pieces 15 and 16 excited by a field exciting winding including coils 19 and 20 on the pole pieces 13 and 14 which provide an excitation as indicated by the arrows 21 and 22 and by coils 23 and 24 which provide components of excitation to the pole pieces 15 and 16, as indicated by the arrows 25 and 26, respectively. This provides a resultant pole formed by the pole pieces 13 and 14 and another resultant pole formed by the pole pieces 15 and 16, providing the desired excitation for the direct current armature winding 6.

In order to operate the machine at a reasonable speed from a mechanical standpoint and yet obtain the desired frequency from the alternating current rotor winding 2, it is desirable that the alternating current field excitation should have a larger number of poles than the direct current excitation system. Since the voltage between the direct current brushes 8 and 9 is dependent only upon the total flux cut by the armature windings between these brushes, it is possible to provide another component of excitation to the pole pieces of the machine to form a four-pole excitation for the alternating current winding without changing the total flux cut by the direct current winding between the brushes 8 and 9, providing the saturation effects of the machine are minimized. In order to minimize the effects of saturation on the machine, a slightly oversize stationary member field structure is provided. The field excitation for the alternating current rotor winding 2 is provided by a field exciting winding including coils 27, 28, 29, and 30 arranged on the salient pole pieces 13, 14, 15, and 16, respectively, to provide components of excitation thereto as indicated by the arrows 31, 32, 33, and 34, respectively, which provide successively opposite polarity compounds of excitation to each of the pole pieces.

The net excitation provided by each of the pole pieces is illustrated graphically in Fig. 2, in which the net or resultant excitation for the different pole pieces is shown by the solid line 35, the direct current armature excitation component of excitation is indicated by the dotted line 36, and the excitation provided by the field exciting winding for the alternating current rotor winding is shown by the dot-and-dash lines 37. The different components of excitation and the resultant excitation for each of the pole pieces is indicated by the numbers 13, 14, 15, and 16 which correspond to the components of excitation provided by the salient pole pieces 13, 14, 15, and 16 in Fig. 1. Thus, it is seen that the total direct current armature excitation provided to the winding 6 by the pole pieces 13 and 14 remains the same even though the resultant excitation of the pole piece 13 is increased by the component of excitation provided by the coil 27, and the excitation of the pole piece 14 is diminished by the excitation provided by the coil 28. Similarly, the net excitation provided by the pole pieces 15 and 16 to the direct current armature winding 6 remains unchanged, although the net excitation provided by the pole piece 15 is diminished by the excitation component provided by the field coil 29, and the net excitation of the pole piece 16 is increased by the component of excitation provided by the field coil 30. Similarly, the frequency of the alternating current induced in the alternating current winding 2 has the same value as if the component of excitation provided by the winding for the direct current armature excitation were entirely omitted. It is clear, therefore, that either of the excitation systems may be varied at will without providing any substantial net or resultant effect on the excitation system of the other winding of the rotatable member. These control variations may be provided for in any suitable manner, as by variable resistors 38 and 39 connected to the sources of electrical power supply which energize the two field exciting windings described.

In order to improve the independence of the two windings of the rotatable member, I provide a compensating field exciting winding arrangement including coils 40 and 41 connected to the brushes 8 and 9 through commutating field exciting windings 42 and 43. These compensating field exciting windings 40 and 41 are adapted to provide a component of excitation, as indicated by the arrows 44, which substantially neutralize by the armature reaction resulting from current in the direct current armature winding 6, such that this component of armature reaction has substantially no effect on the excitation provided to the alternating current rotor winding 2. In order to improve the commutation of the direct current armature winding, the commutating field exciting winding coils 42 and 43 are arranged to provide components of excitation as indicated by the arrows 45, as in a conventional direct current machine. In order to minimize the effect of this commutating component of excitation on the alternating current rotor winding 2, the commutating salient pole pieces 17 and 18 are formed with a slightly larger air gap than that of the main pole pieces of the machine. The compensating field exciting winding and the commutating field exciting winding are connected in series with the direct current brushes 8 and 9 and are, therefore, directly responsive to the variations in the direct current in the armature winding 6 and provide the desired compensating and commutating components of excitation for this winding, irrespective of the alternating current which may be induced in the alternating current winding 2, and minimize the effects of armature reaction upon the alternating current rotor winding.

In Fig. 3, I have shown another embodiment of my invention in which both of the control components of excitation are provided to the pole pieces by a single field exciting winding energized by two separate sources of energization which can be controlled independently of each other to provide the two components of excitation to the pole pieces in the same manner as that shown in Fig. 1, providing the same resultant or net component of excitation as shown by the graph in Fig. 2. In this construction, as in the machine shown in Fig. 1, the rotatable member 1 is provided with an alternating current rotor winding 2 connected to collector rings 3 with collector brushes 4 arranged in contact with the collector rings 3 and connected to the alternating current terminal leads 5 of the machine. The rotatable member also is provided with a direct current armature winding 6 connection to a conventional direct current commutator 7 and is provided with direct current collector brushes 8 and 9 connected to the direct current terminal leads 10 and 11 through field exciting windings similar to those shown in Fig. 1. In this arrangement, a single control field exciting winding is adapted to provide the excitation to the stationary member magnet frame 12, and the main salient pole pieces 13, 14, 15, and 16, and includes exciting coils 46, 47, 48, and 49, respectively, which are adapted to be energized by a component of energization provided by a source of electrical power supply 50 to provide a component of excitation to the pole pieces, as indicated by the arrows 51 and 52, to the field pole pieces 13 and 14 and, as indicated by the arrows 53 and 54, to the salient pole pieces 15 and 16, respectively, thus providing a single pair of resultant poles for this component of excitation, in the same manner as that shown in the previous construction. A second source of energization 55 is connected to the field exciting winding coils 46, 47, 48, and 49 at the interconnections intermediate the connections of these coils to the source of energization 50, so as to provide a second component of energization to these coils which will provide a component of excitation to the salient pole pieces 13, 14, 15, and 16, as indicated by the arrows 56, 57, 58, and 59, which are alternately of opposite polarity in adjacent pole pieces, thereby providing four poles by this component of excitation which provides the desired excitation for the alternating current rotor winding 2. Thus, the excitation provided to the direct current armature winding 6 by the single pair of poles may be indicated in Fig. 2 by the dotted line, and the excitation provided by the four component poles of magnetic excitation by the component of excitation provided by the source of energization 55 may be represented by the dot-and-dash line 37 in this figure, with the resultant or net excitation of the pole pieces represented by the solid line 36 in this figure, which is the same as that represented for Fig. 1. With this arrangement, as in the arrangement in Fig. 1, the excitation provided by the exciting winding energized from the source of energization 55 for controlling the alternating current in the rotor winding 2 is cumulative with respect to the component of excitation provided by the energization for providing excitation for the direct current armature winding 6 in alternate pole pieces and is differential with respect thereto in the other pole pieces.

As in the arrangement shown in Fig. 1, the direct current brushes 8 and 9 are connected to a compensating winding having coils 40 and 41 and to a commutating winding having coils 42 and 43 providing components of excitation 44 and 45, respectively, for substantially neutralizing armature reaction due to direct current in the armature winding 6 and for providing the desired commutating component of excitation as in a conventional machine, respectively. The commutating salient pole pieces 17 and 18 also are formed with a relatively larger air gap than the main pole pieces in order to minimize their effect on the alternating current rotor winding 2. The two components of energization provided to the main control field exciting winding may be controlled independently of each other in the same manner as in Fig. 1 by the provision of variable resistors 60 and 61 for independently controlling these two components of energization. As in the construction shown in Fig. 1, this arrangement provides for the independent control of the alternating and direct currents generated by the machine without materially affecting the other type of current generated by the machine by the provision of a relatively larger magnetic circuit to minimize the effects of saturation on the magnetic excitation of the machine.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States is:

1. A dynamoelectric machine for generating alternating current and direct current including a rotatable member having a direct current armature winding and a commutator connected thereto and an alternating current rotor winding with collector rings connected thereto, and a stationary member having means for magnetically field exciting said stationary member arranged to provide a resultant component pair of magnetic field poles thereto for exciting said direct current armature winding, and means for providing a second component of excitation to said stationary member for providing two component pairs of magnetic field poles providing a component of magnetic excitation cumulative with said first-mentioned field excitation to alternate poles of said second field poles and a component of magnetic excitation differential with said first-mentioned field excitation to the other of said second field poles for exciting said alternating current rotor winding.

2. A dynamoelectric machine for generating alternating current and direct current including a rotatable member having a direct current armature winding and a commutator connected thereto and an alternating current rotor winding with collector rings connected thereto, and a stationary member having means for magnetically exciting said stationary member arranged to provide a resultant component set of magnetic field poles thereto for exciting said direct current armature winding, and means for providing a second component of excitation to said stationary member for providing a multiple of said component set of magnetic field poles providing a component of magnetic excitation cumulative with said first-mentioned field poles to alternate of said second component poles and a component of magnetic excitation differential with said first field poles to the other of said second component poles for exciting said alternating current rotor winding.

3. A dynamoelectric machine for generating alternating current and direct current including a rotatable member having a direct current armature winding and a commutator connected thereto and an alternating current rotor winding with collector rings connected thereto, and a stationary member having four pole pieces, means for magnetically exciting said pole pieces arranged to provide a resultant component pair of magnetic field poles thereto for exciting said direct current armature winding, and means for providing a second component of excitation to said pole pieces for providing two component pairs of magnetic field poles by said pole pieces providing a component of magnetic excitation cumulative with said first-mentioned field exciting winding to alternate of said pole pieces and a component of magnetic excitation differential with said first field exciting winding to the other of said pole pieces for exciting said alternating current rotor winding.

4. A dynamoelectric machine for generating alternating current and direct current including a rotatable member having a direct current armature winding and a commutator connected thereto and an alternating current rotor winding with collector rings connected thereto, and a stationary member having four pole pieces and a field exciting winding arranged to provide a resultant pair of magnetic field poles thereto, and a second field exciting winding arranged to provide two pairs of magnetic field poles by said pole pieces and providing magnetic excitation cumulative with said first-mentioned field exciting winding to alternate of said pole pieces and magnetic excitation differential with said first field exciting winding to the other of said pole pieces.

5. A dynamoelectric machine for generating alternating current and direct current including a rotatable member having a direct current armature winding and a commutator connected thereto and an alternating current rotor winding with collector rings connected thereto, and a stationary member having means for magnetically exciting said stationary member arranged to provide a resultant component set of magnetic field poles thereto for exciting said direct current armature winding, means for providing a second component of excitation to said stationary member for providing a multiple of said component set of magnetic field poles providing a component of magnetic excitation cumulative with said first-mentioned field poles to alternate of said second component poles and a component of magnetic excitation differential with said first field poles to the other of said second component poles for exciting said alternating current rotor winding, and means including a compensating field exciting winding energized responsive to current in said direct current armature winding and arranged to provide a resultant component of magnetic excitation in opposition to armature reaction produced by current in said direct current armature winding for substantially neutralizing said armature reaction.

6. A dynamoelectric machine for generating alternating current and direct current including a rotatable member having a direct current armature winding and a commutator connected thereto and an alternating current rotor winding with collector rings connected thereto, and a stationary member having means including a field exciting winding arranged and having a component of energization to provide a resultant component pair of magnetic field poles thereto for exciting said direct current armature winding, and means for providing a second component of energization to said field exciting winding arranged to provide two component pairs of magnetic field poles providing a component of magnetic excitation cumulative with said first-mentioned field exciting winding component of energization to alternate of said second component poles and a component of magnetic excitation differential with said first field exciting winding component of energization on the other of said second component poles.

7. A dynamoelectric machine for generating alternating current and direct current including a rotatable member having a direct current armature winding and a commutator connected thereto and an alternating current rotor winding with collector rings connected thereto, and a stationary member having four pole pieces, means including a field exciting winding arranged and having a component of energization to provide a resultant component pair of magnetic field poles thereto for exciting said direct current armature winding, and means for providing a second component of energization to said field exciting winding arranged to provide two component pairs of magnetic field poles by said pole pieces providing a component of magnetic excitation cumulative with said first-mentioned field exciting winding component of energization to alternate of said pole pieces and a component of magnetic excitation differential with said first field exciting winding component of energization to the other of said pole pieces.

8. A dynamoelectric machine for generating alternating current and direct current including a rotatable member having a direct current armature winding and a commutator connected thereto and an alternating current rotor winding with collector rings connected thereto, and a stationary member having four pole pieces, means for magnetically exciting said pole pieces arranged to provide a resultant component pair of magnetic field poles thereto for exciting said direct current armature winding, means for providing a second component of excitation to said pole pieces for providing two component pairs of magnetic field poles by said pole pieces providing a component of magnetic excitation cumulative with said first-mentioned field exciting winding to alternate of said pole pieces and a component of magnetic excitation differential with said first field exciting winding to the other of said pole pieces, and means including a compensating field exciting winding energized responsive to current in said direct current armature winding and arranged to provide a resultant component of magnetic excitation in opposition to armature reaction produced by current in said direct current armature winding for substantially neutralizing said armature reaction.

9. A dynamoelectric machine for generating alternating current and direct current including a rotatable member having a direct current armature winding and a commutator connected thereto and an alternating current rotor winding with collector rings connected thereto, and a stationary member having a field exciting winding arranged to provide a resultant component pair of magnetic field poles thereto, a second field exciting winding arranged to provide two component pairs of magnetic field poles providing a magnetic excitation cumulative with said first-mentioned field exciting winding to alternate of said second field poles and magnetic excitation differential with said first field exciting winding to the other of said second field poles, and means including a compensating field exciting winding energized responsive to current in said direct current armature winding and arranged to provide a resultant component of magnetic excitation in opposition to armature reaction produced by current in said direct current armature winding for substantially neutralizing said armature reaction.

10. A dynamoelectric machine for generating alternating current and direct current including a rotatable member having a direct current armature winding and a commutator connected thereto and an alternating current rotor winding with collector rings connected thereto, and a stationary member having four pole pieces and a field exciting winding arranged to provide a resultant pair of magnetic field poles thereto, a second field exciting winding arranged to provide two pairs of magnetic field poles by said pole pieces and providing magnetic excitation cumulative with said first-mentioned field exciting winding to alternate of said pole pieces and magnetic excitation differential with said first field exciting winding to the other of said pole pieces, and means including a compensating field exciting winding energized responsive to current in said direct current armature winding and arranged to provide a resultant component of magnetic excitation in opposition to armature reaction produced by current in said direct current armature winding for substantially neutralizing said armature reaction.

11. A dynamoelectric machine for generating alternating current and direct current including a rotatable member having a direct current armature winding and a commutator connected thereto and an alternating current rotor winding with collector rings connected thereto, and a stationary member having four pole pieces and a field exciting winding arranged to provide a resultant pair of magnetic field poles thereto, a second field exciting winding arranged to provide two pairs of magnetic field poles by said pole pieces and providing a magnetic excitation cumulative with said first-mentioned field exciting winding to alternate of said pole pieces and magnetic excitation differential with said first field exciting winding to the other of said pole pieces, means including a commutating field exciting winding for providing commutating excitation between said resultant pair of magnetic field poles for said direct current armature winding, and means including a compensating field exciting winding energized responsive to current in said direct current armature winding and arranged to provide a resultant component of magnetic excitation substantially along the direct current commutating pole axis in opposition to armature reaction produced by current in said direct current armature winding for substantially neutralizing said armature reaction.

ALEC FISHER.

CERTIFICATE OF CORRECTION.

Patent No. 2,385,199. September 18, 1945.

ALEC FISHER.

It is hereby certified that error appears in the printed specification of the above numbered patent requiring correction as follows: Page 1, second column, line 50, for "compounds" read --components--; and that the said Letters Patent should be read with this correction therein that the same may conform to the record of the case in the Patent Office.

Signed and sealed this 25th day of December, A. D. 1945.

Leslie Frazer (Seal) First Assistant Commissioner of Patents.